Dec. 30, 1969 B. A. DREYFUS 3,486,931
FILM OXIDE RESISTIVE LAYERS
Filed Oct. 31, 1966

Inventor:
Bertrand A. Dreyfus
By Kenyon Reeves Stewart
and Estabrook
Attorneys 3,486,931
FILM OXIDE RESISTIVE LAYERS
Bertrand Alain Dreyfus, Sevres, France, assignor, by mesne assignments, to Compagnie Internationale pour l'Informatique, Louveciennes, France, a corporation of France
Filed Oct. 31, 1966, Ser. No. 590,906
Claims priority, application France, Dec. 8, 1965, 41,384
Int. Cl. H01b 3/10; B44d 1/08
U.S. Cl. 117—201 5 Claims

ABSTRACT OF THE DISCLOSURE

The resistivity of a thin tin oxide layer is varied throughout its thickness by continuously varying the proportions of at least two distinct solutions leading to distinct resistivities during the spraying thereof for deposition of the layer onto a heated substrate.

Figure 1:
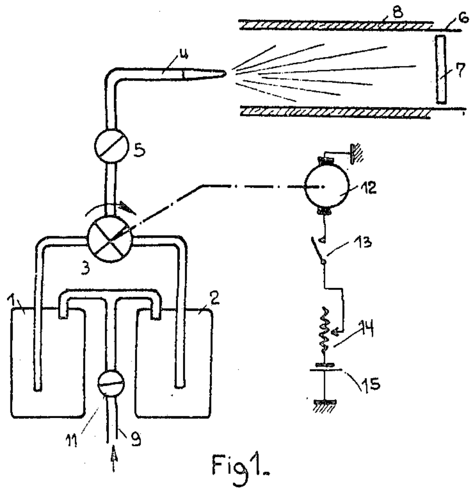

The present invention concerns improvements in or relating to film oxide resistive layers produced from the pyrolytic dissociation at a heated carrier of a fog obtained by spraying a solution of acid medium containing a halide, and more particularly a chloride, of an element such as tin.

In order to stabilize the thus produced layers and consequently to ensure the reproducibility thereof, applicant has provided in his former application Ser. No. 459,036 filed May 26, 1965, now Patent No. 3,402,027, to introduce within the sprayed solution a doping impurity of a P type with respect to the N type tin oxide, said doping impurity being taken from the group constituted by aluminium, indium, gallium and boron with a rate in the solution which hardly outpasses .05% per weight of the tin within said solution; preferably such introduction is made by mixing two solutions, one containing the tin compound and the other a compound of such a doping impurity element, immediately before spraying.

Of course, as explained in his co-pending application, such a doping does not change in itself the range of resistance values obtained in the oxide layers. It acts as a stabilizer agent of the defect of stoichiometry in the tin oxide and consequently enables the obtention of stable resistance values for relatively wide ranges of the rate of said impurity in the solution to spray. Without any further provision, the range of values of the resistance per square obtained with tin oxide pyrolized in such conditions does not exceed some thousands of ohms.

For obtaining a higher range of resistances of the tin oxide films, without affecting the stabilization operated as above, applicant has provided in his application Ser. No. 459,036 filed May 26, 1965, to introduce in the sprayed solution an oxidizing reagent which favorably enters in the oxide-reduction reactions within said solution and also and essentially in the oxidation reaction of the tin contacting the heated carrier surface and during the passage from the outlet of the sprinkler which sprays such a solution up to this surface. Such an oxidising reagent, for instance zinc oxide, reduces the proportion of unoxidised tin in the layers and consequently increases the resistance of said layers. The zinc oxide is introduced at a quite low rate within the solution, some milligrams against 100 grams of tin chloride but it suffices to very slightly vary such a rate to obtain a substantial modification of the stoichiometric defect in the films. For a given rate however, this defect is stabilized by the presence of the doping P type impurity as stated.

According to the present invention, a film oxide resistive layer comprising tin oxide obtained from pyrolytic dissociation of a fog comprising a halide of tin plus a halide of a compensating impurity for doping the tin oxide when contacting a heated surface of an insulating carrier, is characterized in that it presents across its thickness from the surface of the carrier to its exposed final surface, a continuous variation of the stoichiometric defect ensuring a continuous decrease of resistivity in the layer from a higher value at the surface of the carrier to a lower value which may be at some intermediate plane or at the exposed final surface, from a simultaneous spraying in a programme controlled proportion of both a solution containing an oxidising reagent and a solution free from such a reagent.

Figure 2:
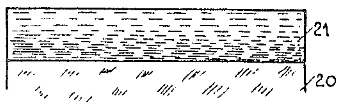
Figure 3:
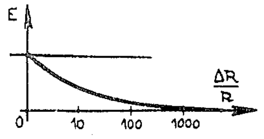
Figure 4:
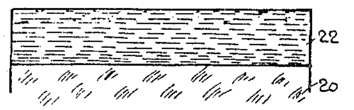
Figure 5:
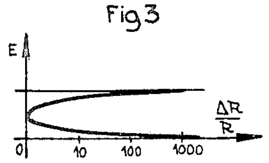
Figure 6:
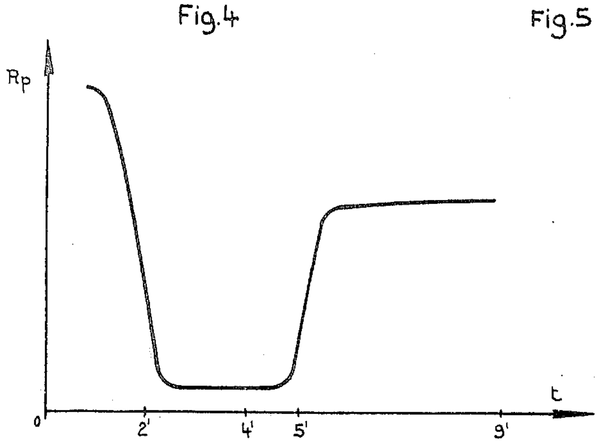

For explaining the invention, the accompanying drawings show:

FIG. 1, an illustrative arrangement of a production set;

FIGS. 2 and 4, illustrative cross-sections of layers obtained with said set;

FIGS. 3 and 5, respective graphs showing the changes in resistance of the layers with respect to variations of their thicknesses; and FIG. 6, a picture of the variation of resistance obtained with respect to the time of spraying for a constant flow of the spray.

In the apparatus disclosed in FIG. 1, two bottles 1 and 2 are shown with outlets to a mixer 3 the output of which is directed through a flow control nipple to a sprinkler 4. This sprinkler is placed in front of the input of an oven 6 within which is placed a receiving plate 7 constituting a heated carrier for the pyrolytic dissociation of the fog issuing from the sprinkler. Actually, as known, the plate 7 comprises a fixture to which are affixed the successive carriers for the oxide films. Said plate, as also known, may be rotated during the production of the oxide layer. The oven 6 is heated by any known means, for instance by electrical resistors such as 8 for bringing and maintaining the carrier 7 at a predetermined temperature during the spraying operation. For instance, such a temperature may be comprised between 550 and 600° C. and it is maintained by a heater regulator arrangement, not shown as outside the field proper of the invention, when the nipple 5 is not operated during the spray and consequently the input of the fog in the oven remains substantially constant.

The supply of the sprinkler is controlled for instance from the operation of a cock 10 in a pipe 9 the outlets of which are within the bottles 1 and 2 respectively, so that introduction of an inert fluid under pressure within said bottles from said pipe will produce an exhaust of the solutions contained in said bottles through the mixer cock 3 with a proportion controlled from the condition of said mixer cock. Such a fluid may merely be compressed air.

The bottle 1 contains a solution comprising an oxidising reagent in addition to the tin chloride and to the doping impurity chloride (for instance aluminum chloride), within an acid medium such as distillated or de-ionized water mixed with hydrochloric acid. The bottle 2 contains a similar solution except for the lack of oxidising reagent therein. If the production was made solely with the solution in the bottle 1, the resistance value of the layer would be in the higher range of resistances and, for instance, in the range of the hundreds of kilohms. If on the other hand the operation were solely made with the content of the bottle 2, the resistance value of the layer thus obtained would be in the lower range of resistances, i.e., in the range of the hundreds of ohms per square. The difference between such ranges of resistance values must consequently be understood as being from one thousand to one when passing from one solution to the other one. The detail of compositions of such solutions may be found in my abovementioned prior applications for patent.

According to the invention, the layer must be formed with a defect of stoichiometry which is progressively and continuously varied from a progressive and continuous control of the proportions of the solutions from the bottles 1 and 2 which are simultaneously sprayed. At the beginning of the operation, the product from the pyrolytic dissociation must present a higher electrical resistivity and this value must be progressively reduced during the time (if desired, after such a reduction, it may come back to the higher value near the end of the operation. Consequently, at the start of the operation, the mixer 3 is in a position such that only the solution from the bottle 1 is sprayed and then said mixer cock is rotated in the direction of the arrow for instance, for admitting a progressively higher quantity from the solution in the bottle 2 to the sprinkler whereas the proportion of the solution from the bottle 1 is concomitantly reduced for maintaining a constant output from the sprinkler. With such a control, the structure of the oxide film resistance is obtained as indicated in FIG. 2 wherein, on the carrier 20, is shown a layer 21 the resistance is shown, by a mere artifice of drawing to decrease from the surface of the carrier up to the exposed final surface of the layer. The profile of the variation of resistivity within the layer with respect to the thickness E is shown in FIG. 3, said variation $\Delta R/R$ being plotted as abscissae and the thickness as ordinates.

As a modification, the resistivity may first decrease and thereafter increase anew as shown in FIG. 4 at 22. FIG. 5 shows a profile of variation of $\Delta R/R$ with respect to the variation of thickness of the layer, plotted similarly as the one in FIG. 3.

Such variations in a mixture are easy to obtain with a rotating cock. Manually, the operator may follow a predetermined time chart which, for varied positions of the cock 5, will indicate to him the time instants whereat the angular position of the mixer cock 3 is to be modified and to what extent each one of such modifications is to be made, such chart also taking into account the overall thickness of the layer to be obtained. However, it is preferable not to have a manual control but an automatic one, from a motor 12 actuated from a battery 15 or any other D.C. source when the switch 13 is closed. A rheostat 14 enables an adjustment of the length of a complete rotation of the motor 12. The switch 13 may be mechanically linked to the cock 11. The shaft of the motor is linked to the shaft of the rotatable dome of the mixer cock 3. The programme is defined either by the very cutting of said dome with respect to its angular position or, better, it is defined by a member controlling the rotation of the motor 12 and/or the shaft of the cock 3: such a programme may consist, as known for any machining operation control, in one or more profiled cams controlling the rotating shafts.

The programme can be such as follows: at the beginning of the operation, only the solution in the bottle 1 is sprayed so that a first thickness of film is formed at the carrier surface with a very high resistivity so as to completely coat said surface, thereafter, the control of the cock 3 begins to introduce an amount of more and more importance of the solution in the bottle 2 in the flow to the sprinkler 4, whereas, on the other hand, said cock admits lesser and lesser of the solution in the bottle 2 to the input of said sprinkler. Finally the solution from the bottle 2 is sprayed alone during a predetermined time interval. Thereafter, either the operation is stopped, which corresponds to the case shown in FIGS. 2 and 3, or the operation is continued in a reverse progressivity for the solutions, which corresponds to the case shown in FIGS. 4 and 5. The operation may end during a time interval in which both solutions are simultaneously sprayed in a definite proportion. Further, the transitions may be when required as abrupt as needed. For instance, referring to FIG. 6, the variation of the resistance per square $R_p$ is plotted against the time $t$ in an application where two relatively sudden transitions exist: a first passage from bottle 1 to bottle 2 near the second minute of spraying during which the solution from bottle 2 is progressively though relatively rapidly (in about thirty seconds) to the solution of bottle 1 in the spray from the sprinkler, and a second passage near the fifth minute (also lasting about 30 seconds of time) for passing from a condition whereat only bottle 2 supplies the sprayed solution to a condition in which both bottles contribute to such a supply in a predetermined ratio. As the curves of FIGS. 3 and 5 the curve of FIG. 6 is solely qualitative.

It is known that the defect of stoichiometry in an oxide layer produced from a pyrolytic dissociation is, inter alia, dependent from the temperature of the carrier but it is obviously wishable in order to control the conditions of the pyrolytic reaction that the temperature of said carrier be regulated with a fairly good approximation from a regulation of the heater. Once the temperature of the carrier 7 stabilized, the operation begins and the solution is sprayed thereat. The solution and consequently the spray is at a much lower temperature than the carrier and at the beginning of the operation, this will cause a temporary lowering of the temperature of the carrier surface on which the film is progressively formed. The temporary decrease of temperature is all the more important that the volume of the spray is. However, the heat regulation will quickly get the temperature of the carrier back to its predetermined value. It must be noted that such a temporary departure of the temperature from its value is not destructive of the effects sought by the present invention because, as a fact, it will contribute to the formation of a homogeneous first coating of the surface of the carrier by a film of high resistivity and the return to a higher temperature (all variations of temperature are damped by the thermal inertia of the carrier and its support within the oven) will smooth the passage to a lower resistivity from the supply of a progressively more important ratio of the solution from the bottle 2 in the spray. Indicatively, for obtaining, during the formation of the film, a temporary decrease by about 100° C. of the temperature of the surface of the carrier, the supply from the sprinkler ought to be increased in a 5 to 1 ratio. Such a figure explains why, though it may be possible so to do, the invention does not contemplate to control the cock 5 from a programme because it would not be easy to have this cock controlled for varying the supply to the sprinkler within such a range of volumes and further simultaneously controlling without strenuous conditions the temporary fluctuations of the temperature of the carrier with respect of such variations in volume of the spray. In other words, the cock 5 is provided for a previous adjustment of the volume of the solution and mixture of solutions to be supplied to the sprinkler in accordance with a predetermined set of conditions to obtain in the film but once this preliminary adjustment is made, the cock 5 will not further be considered in the control of the variation of resistivity of the produced film or films.

What is claimed is:

1. A film oxide resistive member comprising a layer of nonstoichiometric tin oxide intimately bonded to a surface of an insulating carrier, in which layer the electrical resistivity progressively and continuously decreases from a higher value at the surface bonded to said carrier to a lower value at at least a level intermediate between the said surface and the exposed surface thereof.

2. Member according to claim 1, wherein in said layer the said exposed surface is at said lower value of resistivity.

3. Member according to claim 1, wherein in said layer, the electrical resistivity re-increases from said intermediate level up to said exposed surface.

4. Method of production of film oxide resistive members comprising a layer of nonstoichiometric tin oxide intimately bonded to a surface of an insulating carrier, in which layer the electrical resistivity progressively and continuously decreases from a higher value at the surface bonded to said carrier to a lower value at a level intermediate between the said surface and the exposed surface of said layer, said method comprising the steps of spraying on the heated surface of said carriers for decomposition at the contact thereof a mixture of two fogs obtained from two solutions respectively adapted to produce a higher resistivity oxide and a lower resistivity oxide and, said spraying starting with a spray of the higher resistivity fog, while progressively and continuously modifying the ratio of mixture of the two solutions into said fog in a predetermined manner while maintaining the volume of said fog at a substantially constant value.

5. Method according to claim 4, wherein the ratio of the intrinsic resistivities of the tin oxides from the two fogs is of about one thousand to one.

No references cited.

WILLIAM L. JARVIS, Primary Examiner

U.S. Cl. X.R.

117—104, 211, 212; 338—308